US012726581B2

(12) United States Patent
Friebe et al.

(10) Patent No.: US 12,726,581 B2
(45) Date of Patent: Sep. 1, 2026

(54) METHOD FOR REPRESENTING A HARMONIZED OBSCURED AREA OF AN ENVIRONMENT OF A MOBILE PLATFORM

(71) Applicant: Continental Automotive GmbH, Hannover (DE)

(72) Inventors: Markus Friebe, Gefrees (DE); Chetan Gotur, Bangalore (IN); Pavan Nag Prabhakar, Bangalore (IN); Abhishek Ranjan, Bangalore (IN)

(73) Assignee: Continental Automotive GmbH, Hannover (DE)

( * ) Notice: Subject to any disclaimer, the term of this patent is extended or adjusted under 35 U.S.C. 154(b) by 859 days.

(21) Appl. No.: 17/595,909

(22) PCT Filed: May 20, 2020

(86) PCT No.: PCT/EP2020/064016
§ 371 (c)(1),
(2) Date: Nov. 29, 2021

(87) PCT Pub. No.: WO2020/239555
PCT Pub. Date: Dec. 3, 2020

(65) Prior Publication Data

US 2022/0321836 A1 Oct. 6, 2022

(30) Foreign Application Priority Data

May 29, 2019 (EP) .................................... 19177339

(51) Int. Cl.
*H04N 5/00* (2011.01)
*B60R 1/27* (2022.01)
(Continued)

(52) U.S. Cl.
CPC ............... *H04N 5/265* (2013.01); *B60R 1/27* (2022.01); *G06T 7/74* (2017.01); *G06T 2207/30252* (2013.01)

(58) Field of Classification Search
CPC .......... H04N 5/265; H04N 7/181; G06T 7/74; G06T 2207/30252; G06T 3/4038; B60R 2300/607; B60R 1/00
See application file for complete search history.

(56) References Cited

U.S. PATENT DOCUMENTS 6,813,391 B1 11/2004 Uyttendaele et al.
7,346,212 B2 * 3/2008 Cheatle ................ H04N 1/3872 382/173

(Continued)

FOREIGN PATENT DOCUMENTS

CN 103501415 A 1/2014
CN 104240211 A 12/2014

(Continued)

OTHER PUBLICATIONS

Japanese Notice of Reasons for Refusal drafted on Jan. 5, 2023 for the counterpart Japanese Patent Application No. 2021-567063.

(Continued)

*Primary Examiner* — Ping Y Hsieh
*Assistant Examiner* — Xiao Liu

(57) ABSTRACT

A method is disclosed for representing an obscured area of a mobile platform environment relative to an object area of a first and second imaging devices of the mobile platform, including determining a delta-area, being the difference of a second obscured area of the environment which is obscured in respect to the object area at a second time step, and a first obscured area of the environment which is obscured in respect to the object area at a first time step. First and second overlap-images, being an overlap of an image of the first imaging device respectively of an image of the second
(Continued)

imaging device with the delta-area, are determined, wherein both images are taken at the first time step. A difference of an optical property of the images is determined, and the difference of the optical property is harmonized within at least one of the overlap-images.

16 Claims, 3 Drawing Sheets

(51) Int. Cl.

| | |
|---|---|
| ***G06T 7/73*** | (2017.01) |
| ***H04N 5/265*** | (2006.01) |

(56) References Cited

U.S. PATENT DOCUMENTS

| | | | | |
|---|---|---|---|---|
| 10,694,102 | B2 * | 6/2020 | Roulet | G03B 37/04 |
| 2002/0196340 | A1 | 12/2002 | Kato et al. | |
| 2017/0140542 | A1 | 5/2017 | Hodohara | |
| 2020/0023772 | A1 * | 1/2020 | Kurnaz | B60R 1/00 |
| 2020/0086791 | A1 * | 3/2020 | Hardy | G06T 5/50 |

FOREIGN PATENT DOCUMENTS

| | | | | | |
|---|---|---|---|---|---|
| DE | 102013020949 | A1 | | 6/2015 | |
| EP | 1383331 | A1 | | 1/2004 | |
| GB | 2557758 | A | * | 8/2018 | G01D 5/2412 |
| GB | 2559758 | A | | 8/2018 | |
| GB | 2559760 | A | * | 8/2018 | B60R 1/00 |
| JP | 2002324235 | A | | 11/2002 | |
| JP | 2011114536 | A | | 6/2011 | |
| JP | 2013115738 | A | | 6/2013 | |
| JP | 2014229100 | A | * | 12/2014 | |
| JP | 2015222934 | A | | 12/2015 | |
| JP | 2017091284 | A | | 5/2017 | |

OTHER PUBLICATIONS

European Search Report dated Oct. 18, 2021 for the counterpart European Patent Application No. 19177339.9.

International Search Report and the Written Opinion of the International Searching Authority mailed on Jul. 14, 2021 for the counterpart PCT Application No. PCT/EP2020/064016.

Notice of Reasons for Refusal drafted Aug. 16, 2023 for the counterpart Japanese Patent Application No. 2021-567063 and Global Dossier translation of same.

European Examination Report dated Mar. 21, 2022 for the counterpart European Patent Application No. 19177339.9.

Notice of First Office Action dated Nov. 13, 2023 for the counterpart Chinese Patent Application No. 202080039342.8 and machine translation of same.

Notice of Second Office Action dated Apr. 27, 2023 for the counterpart Chinese Patent Application No. 202080039342.8 and machine translation of same.

* cited by examiner

METHOD FOR REPRESENTING A HARMONIZED OBSCURED AREA OF AN ENVIRONMENT OF A MOBILE PLATFORM

CROSS REFERENCE TO RELATED APPLICATIONS

This application claims priority to PCT Application PCT/EP2020/064016, filed May 20, 2020, which claims priority to European patent application 19177339.9, filed May 29, 2019. The disclosures of the above applications are incorporated herein by reference.

FIELD OF INVENTION

The present invention relates to a method for representing an obscured area of an environment of a mobile platform, the area obscured in respect to object areas of a first and a second imaging device of the mobile platform.

BACKGROUND

A mobile platform may be an at least partially automated system, which is mobile, as e.g. an at least partially automated vehicle, and/or a vehicle including a driver assistance system.

Such a vehicle may include a driver assistance system for visualization of a surrounding environment of the vehicle. This driver assistance system may be referred to as a surround-view-system and usually comprises one or more imaging devices, as for instance cameras or video systems, which may be mounted at the vehicle e.g. on top of the vehicle, wherein each imaging device may provide a different viewing area or allows a different viewing angle in respect to the environment. That means the object area of the different imaging devices is different, wherein an object area is an area an imaging device is able to capture images of objects, which are physically located within that area.

Because of physical and optical restrictions, such imaging devices typically have a "blind spot"-area, which means that there are areas of the environment, which are obscured in respect to actual images of such imaging devices. For instance, this may be the area from the ground underneath the mobile platform, as e.g. the ground underneath a vehicle hidden by the vehicle itself.

There may be differences of the optical properties between raw images taken by different imaging devices directed to different parts of the environment, even in areas where both object areas overlap. Composing images for presenting obscured areas, based on such images of different imaging devices with different optical properties of the compost sections, each section originating from different imaging devices degrades the overall visual quality of the compost image.

The area underneath the bonnet of a vehicle is of special importance because of the usage of such images of the obscured area for parking or off-road conditions. The differences in the optical properties of images of different imaging devices around the mobile platform may be related to brightness differences, color differences in respect the used imaging devices including quality issues of the generated images, as well as the environmental conditions as e.g. shadows or other issues, which may disrupt or annoy a combination of such images.

SUMMARY

Accordingly, the present disclosure is directed to a method for representing an obscured area of an environment of a mobile platform, a surround-view-system, a mobile platform, a computer program, and a computer-readable storage medium as described in the independent claims.

Advantageous modifications of the present disclosure are stated in the dependent claims. All combinations of at least two of the features disclosed in the description, the claims, and the figures fall within the scope of the present disclosure. In order to avoid repetition, features disclosed in accordance with the method shall also apply and be claimable in accordance with mentioned systems.

Steps of the method are presented in an order to explain the method, but the method should not be understood as to be restricted to this order, as any expert will understand, that the objective of the present disclosure can be achieved using different orders.

Aspects of the present disclosure are based on the inside, that an obscured area of the mobile platform, like a vehicle, may be composed and in this way representing an obscured area by image data achieved at a prior time step by the imaging device taking images, when the actual obscured area was visible. That means an area obscured at a second time step may have been visible in the object area of an imaging device at a first time step, because of the movement of the mobile platform including the imaging devices between the first and second time step.

An aspect of the present disclosure provides a method for representing an obscured area of an environment of a mobile platform in respect to an object area of a first and a second imaging device of the mobile platform.

In a step of the method, a delta-area is determined, being the difference of a second obscured area of the environment and a first obscured area of the environment. The second obscured area is obscured in respect to the object area of the first and second imaging device at a second time step. In addition the first obscured area of the environment is obscured in respect to the object area of the first and second imaging device at a first time step.

In another step, a first overlap-image and a second overlap-image is determined, being an overlap of an image of the first imaging device respectively of an image of the second imaging device with the delta-area, wherein both images are taken at the first time step.

In another step, a difference of an optical property of the images of the first and the second imaging device is determined.

In another step, the difference of the optical property within at least one of the overlap-images is harmonized.

Such an obscured area results from the physical limitation of an individual imaging device to generate images representing the complete environment of a mobile platform. In addition, even if more than one imaging device is used, each imaging device pointing into different directions in respect to the mobile platform, there might be areas of the environment, which are obscured areas in respect to object area of the imaging devices.

The object area of the imaging device is the area where the imaging device is able to generate images of objects in that area.

In this context, the mobile platform includes an at least partially automated system in respect to at least partially automated functionality, but a mobile platform also includes vehicles and other mobile machines, including driver assistance systems. Further examples of mobile platforms may be driver assistance systems utilizing multiple sensors, mobile multi-sensor robots like e.g. robotic vacuum cleaner, or robotic lawn mower, a multi-sensor surveillance system, a manufacturing machine, a personal assistant or an access control system. Each one of these systems may be fully or partially automated systems.

According to one aspect, the method of harmonizing at least the second obscured area includes a method of compensating the optical distortion of the raw images of the imaging devices, which may originate from the optical system used by the mentioned imaging devices.

Optical properties of images may be typically represented by a color and/or brightness of an individual pixel of the image. Beside this optical properties of the smallest unit of an image there may be also optical properties related to groups of pixels like structures or shadow areas.

Harmonizing of these optical properties may relate to a continuously and smooth transition from an optical property at one site of an image having a first optical property to another site of the image having a second optical property. There is a huge variety of techniques to harmonize images. Examples for harmonizing may be harmonizing within the second overlap area, harmonizing with respect to different directions, harmonizing in respect to an identified gradient inside or outside of the obscured area and so on.

Using such a method of composing sections of images of different imaging devices enable to represent obscured areas, even if that area within an actual image of the used imaging devices of the mobile platform is outside of their object area. By harmonizing sections of the representation of an obscured area, which is composed by sections of images of at least two imaging devices of that obscured area, at a point in time when the area was not obscured in respect to the used imaging devices, improves the quality of the representation of that area.

The optical property difference of the images of the first and the second imaging devices may be determined using areas of the images appropriate for the goal of a smooth transition of optical properties and the selection of that areas may also take into account a smooth transition within images of the environment actually taken by the imaging devices. Visualizing of such a composed and harmonize representation of the obscured area, for instance on a screen inside of a vehicle, may give a pleasant picture to a passenger or driver of the vehicle, without annoying harsh contrasts within that picture representing the obscured area. By this the representation of the obscured area, especially beneath the bonnet area of the vehicle is improved.

In another aspect, the difference of the optical property is determined by comparing an optical property of at least a first reference area within the image of the first imaging device and at least a second reference area within the image of the second imaging device.

Referencing the optical properties to areas of images outside of the obscured area gives the advantage, that the representation of the obscured area is automatically adapted to the actual object area of the used imaging devices.

In another aspect, the first reference area and the second reference area is chosen from an object area of the first imaging device and respectively the second imaging device, where both object areas overlap.

Determining the difference of the optical properties of the images, of the at least two imaging devices from object areas of these devices which overlap, results in a good description of the optical properties of the two images. This may determine the difference of the optical properties at that site, where a harsh contrast of combined images may be annoying, because at that site the two images of the different imaging devices adjoin each other.

In another aspect, the difference of the optical properties of the images of the first and the second imaging device is determined by averaging the optical properties within the reference area. This may improve the accuracy of the determination of the difference.

In another aspect, the reference areas are from the same size and overlap each other in the corresponding object area of the environment.

According to a further aspect, the described method for representing an obscured area of an environment may be performed multiple times using different reference areas. Differences of optical properties are characterized, with reference to different directions of the environment, wherein the harmonization within at least one of the overlap-images is performed accordingly, taking into account optical property differences in respect to different directions.

According to a further aspect, the first and/or the second overlap-image is harmonized in respect to an optical property gradient defined by the difference of the optical properties and a length related to the obscured area.

To define such a gradient based on the determined difference of the optical properties a related length may be for instance a borderline of the obscured area like the front borderline or a site borderline at it may be the full line or parts of the line.

According to one aspect, harmonizing of the second obscured area may include harmonizing the second overlap-image by adjusting the pixels of the second overlap-image adjacent to the border between the first overlap-image and the second overlap-image according to the determined optical property of the first imaging device.

Starting at the borderline of the first overlap-image and the second overlap-image each of the pixel of the second overlap-image, which are arranged in parallel to a front side borderline of the second obscured area are linearly adjusted in respect to their optical property in such a way, that the pixel at the side border of the second obscured area are adopted to the optical property of the second image device. All the pixels in between are respectively adapted according to the resulting gradient.

The remaining area of the second overlap-image may be adapted to the particular property of the second imaging device.

That means that there is a smooth transition within the at least one overlap-image for harmonization. The gradient may be calculated taking into account the absolute value of the difference of the optical properties of the images of the first and the second imaging device and the distance, which is defined for instance as explained above by half of a length of the obscured area.

According to a further aspect, the harmonization of the first or second overlap-image includes adjusting an optical property value of each pixel of the first or second overlap-image corresponding to the value and a direction of the gradient.

The adjusting of the optical property value of each pixel can be calculated using a linear formula 1:

$$OP=(1-t)\cdot OP2+(t\cdot OP1) \qquad (1)$$

where OP stands for the optical property a pixel is adjusted to having a distance of 1-t from determined OP1, or a distance of t to the site of the determined OP2. OP2 and OP1 stands for the optical properties of the images of the first and the second imaging devices at the respective sites.

The advantage of adjusting the optical property value of each pixel of the overlap-images corresponding to the gradient in respect to the strength and direction, based on differences of optical properties from reference areas outside of the obscured area, is a smooth transition of the optical properties, wherein the transition may fit to the optical properties of the actual object area representing the environment of the mobile platform.

According to a further aspect, the optical property value is the brightness value and/or the color value.

As explained above the optical property of an individual pixel may be given by a brightness value and a color value. The color value depends on the used color model and typically includes three values for three colors. Harmonization of the brightness or the individual colors may be done with different techniques, but using formula 1 for harmonization is an easy and quick way with small effort and good results. That means every individual color may be harmonized in the same way as the brightness by adjusting the pixel linearly using the determined gradient as described.

According to a further aspect, the delta-area is determined using motion data of the movable platform.

The obscured area may by the area not being part of the object area of at least two imaging devices for instance at a point in time of a first time step. If the mobile platform is moving, the obscured area is moving too and is defined in the same way as explained at a second time step. After defining an obscured area at a first time step the location data of the environment may be updated for a second time step using motion data of the mobile platform. To determine motion data of the mobile platform, for instance ego motion data or data from the controller area network bus (CAN) may be used, for determining the delta-area. A controller area network bus data includes e.g. steering and speed data, ego motion relates to motion data determined from images.

A movement vector may be defined to transfer the obscured area at the first time step to the obscured area at the second time step, if the movement vector gives the distance and direction of the movement between the two time steps.

According to a further aspect, the first imaging device points into the front direction of the mobile platform and the second imaging device at least partially point into the direction of the motion of the mobile platform.

If the second imaging device at least partially point into the direction of the motion of the platform the image of the second imaging device at a first time step overlaps with the actual obscured area and that image may provide the overlap area needed for representing the obscured area.

According to a further aspect, the second obscured area is represented by the harmonized second overlap-image, the first overlap-image, and a section of a representation of the first obscured area.

If the mobile platform is moving straight, there is no need for harmonizing a representation of the obscured area, because the obscured area may be updated by image data of an image device directed into the front of the mobile platform.

If the mobile platform turns in a different direction, for updating the obscured area image data are needed, which originate from a different imaging device.

For complete updated representation of the obscured area a section of the prior obscured area, a section of an image of a first imaging device, which is directed to the front of the mobile platform, and a section, meaning the second overlap region, of an image of the second imaging device are needed. This second overlap region is harmonized as described above to adapt to the other sections and the actual images of the at least two imaging devices.

A further aspect of the method is schematic shown below: Image Data i from front, right and left side of the mobile platform: i_f, i_r, i_l at a point in time t; and a point in time t-1: i_f [t-1], i_r [t-1], i_1 [t-1] are provided by four raw surround cam images; and also an image Patch of the obscured area at a time t-1: g [t-1]. Brightness and/or color harmonization for a projected surface is applied using motion data mv_x, mv_y of the mobile platform. A patch is transformed using: g [x, y, t]=g [x+mv_x, y+mv_y, t-1], where a motion vector is within an image patch. A patch is transformed using: g [x, y, t]=i_f, i_r, i_l, i_r [x+mv_x, y+mv_y, t-1], where motion vector is out of image patchusing the motion data mv_x, mv_y.

A further aspect of the method is schematic shown by the steps of:

Vehicle ON;

Surround View System ON;

Continuously Capture Live Camera Data from Multiple Cameras;

Preserve the Previous Frame data from Multiple Cameras;

Monitor the Ego motion Info from Vehicle;

Harmonize the Image from previously stored Raw data;

Construct the Historical Ground plane View; and

Render the Brightness Corrected Blind spot Ground plane.

A mobile platform may include four imaging devices pointing into different directions to cover the complete environment of the mobile platform but excluding the obscured area beneath the mobile platform. For parking purpose or outdoor activities, it may be helpful for a driver of a vehicle to have access to a representation of that hidden obscured area.

According to a further aspect, the representation of the obscured area is stored in between power cycles of the vehicle. This may provide information about the obscured area of e.g. a vehicle in a parking position from a prior journey to support the departure from the parking position.

According to a further aspect, the representation of the obscured area shown on a screen of the movable platform. This representation as a picture on a screen may support a driver for parking or outdoor activities.

A further aspect relates to a device, which is arranged to perform a method according to method described above. Such a device enables an easy accessible and transportable way to perform the method.

A further aspect relates to a computer program comprising instructions, which, when the program is executed by a computer, cause the computer to carry out the method described above.

A further aspect relates to a computer-readable storage medium on which the above-mentioned computer program is stored.

BRIEF DESCRIPTION OF THE DRAWINGS

Reference will now be made in detail to exemplary embodiments of the present invention, examples of which are illustrated in the accompanying figures.

Figure 1:
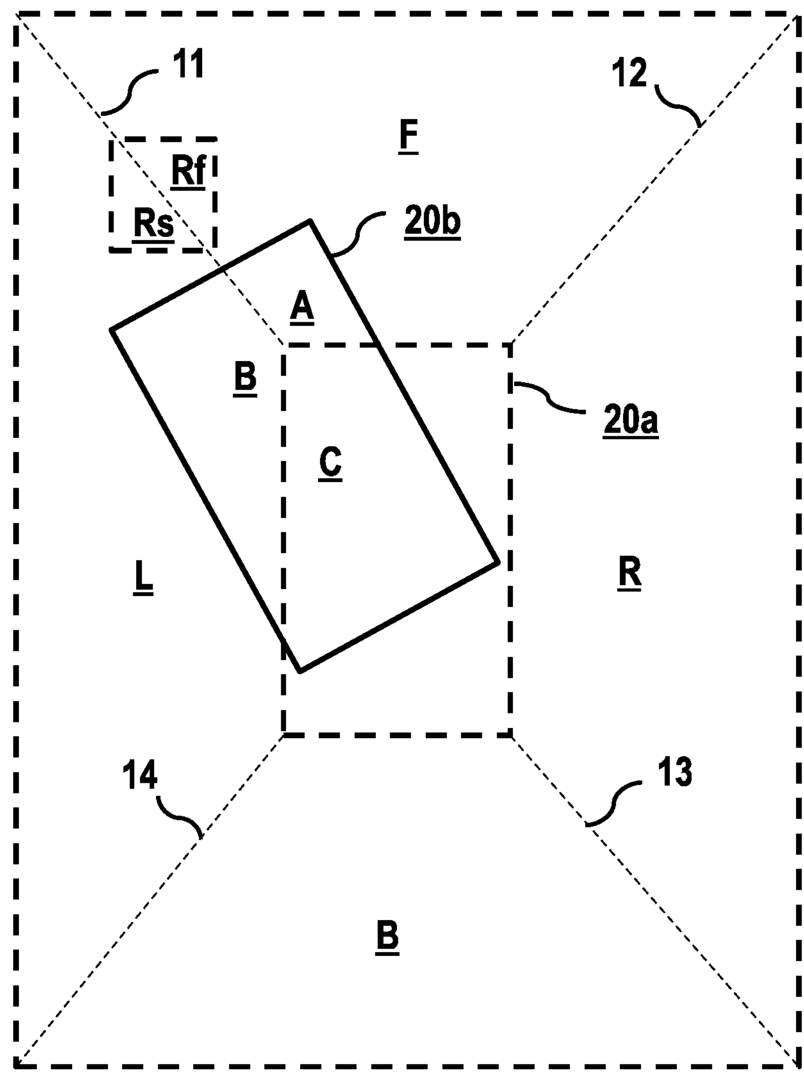
FIG. 1 shows a top-down view to a mobile platform turning to the left including a first and second obscured area.

The figures are merely schematic representations and serve only to illustrate the invention. Advantages and features of the present invention, and implementation methods thereof will be clarified through following embodiments described with reference to the accompanying figures. The present invention may, however, be embodied in different forms and should not be construed as limited to the embodiments set forth herein.

DETAILED DESCRIPTION

A shape, a size, a ratio, an angle, and a number disclosed in the drawings for describing embodiments of the present invention are merely an example, and thus, the present invention is not limited to the illustrated details. The terms of a singular form may include plural forms unless referred to the contrary. In construing an element, the element is construed as including an error range although there is no explicit description.

It will be understood that, although the terms "first", "second", etc. may be used herein to describe various elements, these elements should not be limited by these terms. These terms are used only to distinguish one element from another. For example, a first element could be termed a second element, and, similarly, a second element could be termed a first element, without departing from the scope of the present invention.

The embodiments may be carried out independently from each other, or may be carried out together in co-dependent relationship.

FIG. 1 shows a top-down view of an obscured area 20*a* related to a mobile platform at a first time step as defined above on a ground plane. The mobile platform may include a driver assistance system and/or surround-view system. In this exemplary embodiment, the mobile platform includes at least four imaging devices directed to four different directions in respect to the mobile platform, to enable obtaining a surround view of the current environment of the mobile platform. The imaging devices are arranged in such a way, that an object area F in front of the mobile platform is covered by an imaging device directed to the front of the mobile platform. An object area B in the rear area of the mobile platform is covered by an imaging device directed to the rear of the mobile platform. An object area L respectively an object area R correspond to a left respectively right object area of the mobile platform, which are covered by corresponding imaging devices directed to the left respectively to the right side of the mobile platform.

The object areas of their respective imaging devices may overlap but for representing the environment, the mentioned areas F, B, L and R are defined resulting in borderlines 11, 12, 13, 14 between those areas as shown in FIG. 1.

Because of a movement of the mobile platform e.g. to the left a transformation of the first obscured area 20*a* to a second obscured area 20*b* results as shown FIG. 1. This is because the imaging devices are moving together with the mobile platform resulting in new object areas of each individual imaging device defining the corresponding second obscured area 20*b*.

For updating a given representation of the first obscured area 20*a* after the mobile platform has moved to a new position and resulting in a second obscured area 20*b*, the representation of the second obscured area 20*b* may be assembled from three sections A, B and C as shown in FIG. 1.

In a step S1, a delta-area A-B is determined. The delta area A-B is the difference of the second obscured area 20*b* of the environment, which is obscured in respect to the object area of the first imaging device F and the area of the second imaging device L at a second time step and a first obscured area 20*a* of the environment in respect to the object area of the first imaging device F and the second imaging device L at a first time step.

In a step S2 a first overlap-image A and a second overlap-image B is determined, being an overlap of an image of the first imaging device respectively an overlap of an image of the second imaging device with the delta-area A-B, wherein both images are taken at the first time step. The image of the first imaging device is an image of the object area F of the front imaging device and the image of the second imaging device is an image of the object area L of the left imaging device of the mobile platform. The section for defining the first overlap area A and the second overlap area B is defined by the overlap of the two images with the delta-area A-B, being the sum of the two overlap areas A, B.

The optical properties of the first overlap area A and the still remaining obscured section C of the representation of the first obscured area 20*a* may be already adapted with respect to each other, because the image data for the representation of the first obscured area 20*a* may be based on images from the imaging device directed to the front object area F of the mobile platform.

The optical properties of the second overlap area B, being the overlap of the image of the second imaging device directed to the left object area L of the mobile platform may be different from the optical properties of the image of the first imaging device directed to the front object area of the mobile platform.

In a step S3, a difference of an optical property of the images of the first and the second imaging device is determined.

In particular, this difference of the optical property may be identified by comparing an optical property of at least a first reference area Rf within the image of the first imaging device F and at least a second reference area Rs within the image of the second image-taking device L.

In particular, the at least first reference area Rf and the at least second reference area Rs are areas of the environment, were the object areas of both imaging devices overlap Rf-Rs. That means, that for instance at a borderline 11, where the object area of the first imaging device, in this example the imaging device directed to the front object area F, and the object area of the second imaging device, in this example the imaging device, which is directed to the left object area L, both overlap. For representing the environment there is a borderline defined for instance line 11, where the images of those object areas are adjacent to each other.

This reference area may be at any distance and site from the first obscured area 20*a*, for instance directly adjacent to the first obscured area 20*a* at the borderline 11.

In particular, the difference of the optical properties of the images of the first and the second imaging device may be determined by averaging the optical properties within the first Rf and the second reference area Rs for determining the difference of the optical properties of the image of the first imaging device and the image of the second imaging device.

Particularly the two reference areas Rf, Rs are from the same size and overlap each other in the corresponding object area of the environment.

The second overlap-image B is harmonized in respect to an optical property gradient, which is defined by the difference of the optical properties as described above and a length relative to the first obscured area. In particular, this length may be half of the distance from the front of the obscured area to the rear of the obscured area.

In particular, the harmonization of the second overlap-image includes adjusting an optical property value of each pixel of the second overlap-image corresponding to the value and a direction of the gradient. That means that each image pixel of the second overlap-image is adopted in respect to its optical property correspondingly to the distance from the point within the overlap area, where the difference of the brightness was determined up to the middle of the obscured area, starting with the determined value referenced to the optical property of the image of the front imaging device up to the value of the determined optical property of the left imaging device.

Starting at the borderline 11 of the first overlap-image A and the second overlap-image B each of the pixel of the second overlap-image B, which are arranged in parallel to a front side borderline of the second obscured area 20*b* are linearly adjusted in respect to their optical property in such a way, that the pixel at the side border of the second obscured area are adopted to the optical property of the second image device. All the pixels in between are respectively adapted according to the resulting gradient. The adjusting of the optical property value of each pixel can be calculated using a linear formula 1:

$$OP=(1-t)\cdot OP2+(t\cdot OP1)$$

where t is a typical distance in respect to OP1 and OP2 as described above.

Where OP1 and OP2 are the optical properties of the first Rf and the second reference area Rs. The remaining area of the second overlap-image may be adapted to the particular property of the second imaging device.

That means that there is a smooth transition within the at least one overlap-image for harmonization.

Figure 2:
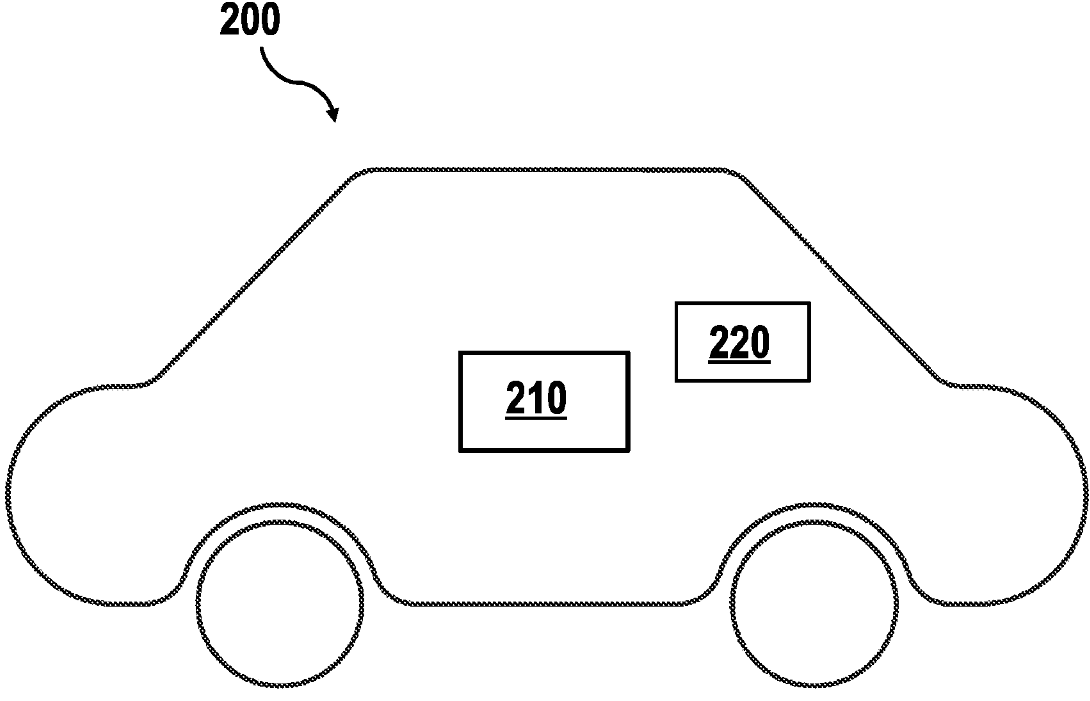
FIG. 2 shows a vehicle including a screen and a surround-view-system.

FIG. 2 schematically shows a vehicle 200 including a screen 220 and a surround-view-system.

Figure 3:
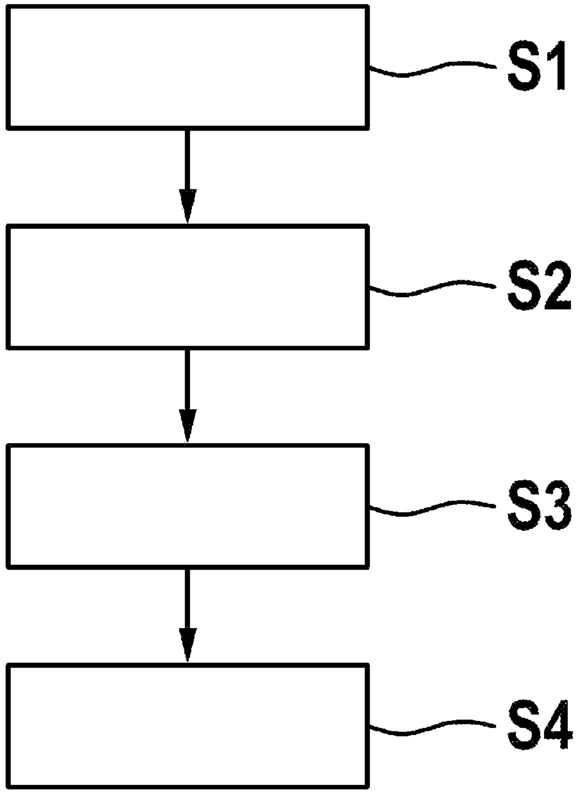
FIG. 3 shows the steps for representing an obscured area of an environment.

FIG. 3 schematically shows the method including steps S1 to S4 as described above.

The invention claimed is:

1. A method for representing an obscured area of an environment of a mobile platform in respect to an object area of a first and a second imaging device of the mobile platform, the method comprising:

determining a delta-area, being a difference of a second obscured area of the environment, which is obscured in respect to the object area of the first and second imaging device at a second time step, and a first obscured area of the environment which is obscured in respect to the object area of the first and second imaging device at a first time step;

determining a first overlap-image and a second overlap-image, being an overlap of an image of the first imaging device respectively of an image of the second imaging device with the delta-area;

determining a difference of an optical property of the images of the first and the second imaging device; and harmonizing the difference of the optical property within at least one of the overlap-images, wherein at least one of the first overlap image or the second overlap-image is harmonized in respect to an optical propert gradient defined by the difference of the optical property and a portion of a length of the first obscured area, and wherein the harmonization of the at least one of the first overlap-image or the second overlap-image includes adjusting an optical property value of each pixel of the first or second overlap-image corresponding to the optical property value and a direction of the optical property gradient.

2. The method according to claim 1, wherein the difference of the optical property is determined by comparing an optical property of at least one first reference area within the image of the first imaging device and at least one second reference area within the image of the second imaging device.

3. The method according to claim 2, wherein the at least one first reference area and the at least one second reference area are areas of the environment were the object areas of both imaging devices overlap.

4. The method according to claim 1, wherein the optical property value is at least one of a brightness value or a color value.

5. The method according to claim 1, wherein the delta-area is determined using motion data of the mobile platform.

6. The method according to claim 1, wherein the first imaging device points into a front direction of the mobile platform and the second imaging device at least partially points into a direction of the motion of the mobile platform.

7. The method according to claim 1, wherein the second obscured area is represented by the harmonized second overlap-image, the first overlap-image and a section of a representation of the first obscured area.

8. The method according to claim 7, wherein the representation of the second obscured area is stored in between power cycles of the vehicle.

9. The method according to claim 7, wherein the representation of the second obscured area is shown on a screen of the mobile platform.

10. A surround-view-system, arranged to perform the method according to claim 1.

11. A mobile platform, preferably a vehicle, including a screen for visualizing a representation of the obscured area, and a surround-view-system according to claim 10.

12. A computer program stored on a non-transitory computer-readable medium and comprising instructions, which, when executed by a computer, cause the computer to carry out the method according to claim 1.

13. The method according to claim 1, wherein the first overlap-image comprises the overlap of the image of the first imaging device with the delta-area, and the second overlap-image comprises the overlap of the image of the second imaging device with the delta-area.

14. The method according to claim 13, wherein the first overlap-image and the second overlap-image are taken at the first time step.

15. The method according to claim 13, wherein the first overlap-image and the second overlap-image are taken at the same time step.

16. The method according to claim 1, further comprising composing the first overlap-image and the second overlap-image based upon the harmonization, and initiating a display of the first overlap-image and the second overlap-image on a display screen associated with the mobile platform.

* * * * *